(12) United States Patent
Smith

(10) Patent No.: US 6,781,803 B1
(45) Date of Patent: Aug. 24, 2004

(54) RELIABILITY OF REDUNDANT SEQUENTIAL CIRCUITS BY CROSS-COUPLING INDIVIDUAL CIRCUIT OUTPUT SIGNALS BETWEEN REDUNDANT CIRCUIT BLOCKS

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 527 days.

(21) Appl. No.: 09/809,852

(22) Filed: Mar. 15, 2001

(51) Int. Cl.[7] .................................................. H02J 7/00
(52) U.S. Cl. ........................................ 361/54; 320/134
(58) Field of Search .............................. 361/54, 62–66, 361/91.1, 93.2; 320/132, 134; 307/36–39, 42

(56) References Cited

U.S. PATENT DOCUMENTS 5,789,900 A * 8/1998 Hasegawa et al. .......... 320/132

* cited by examiner

*Primary Examiner*—Ronald Leja

(57) ABSTRACT

The present invention relates to a method for providing improved reliability in a protective circuit. Specifically, embodiments of the present invention provide improved reliability by coupling the outputs of functional elements of redundant protective circuits through OR gates to the inputs of subsequent functional elements. By this cross-coupling of individual circuit output signals between redundant circuit blocks, a failure of any functional element can be bypassed, allowing any non-failed functional element to supply the signal missing from a failed functional element.

20 Claims, 2 Drawing Sheets

RELIABILITY OF REDUNDANT SEQUENTIAL CIRCUITS BY CROSS-COUPLING INDIVIDUAL CIRCUIT OUTPUT SIGNALS BETWEEN REDUNDANT CIRCUIT BLOCKS

FIELD OF THE INVENTION

The present invention relates to a method for improving the reliability of redundant protection circuits.

BACKGROUND OF THE INVENTION

The growth of the market for small electronic devices has fueled developments on many fronts. The miniaturization of devices has found functions being performed on ever smaller and lighter devices. As the circuitry of electronic devices has continued to shrink, the need for circuit protection has grown. Over-voltage protection circuits exist to prevent damage to small devices and to the batteries that power them.

Over-voltage protection circuits are found in every sort of power supply, battery charging circuit, control circuitry and many others. The circuits are necessary to protect tiny electronic elements from the damage that excessive voltages and currents can cause.

Battery charging, in particular, can expose batteries to significant damage in the event of overcharging. This is especially true of high density rechargeable batteries such as Nickel-Cadmium (NiCd), Nickel-Metal Hydride (NiMH) and Lithium Ion (Li-Ion). Overcharging of Lithium Ion batteries also includes the additional risk of an explosive hazard.

High density batteries that are specially designed for a particular application can be expensive. Most users of cellular phones, for instance, cannot easily acquire spares. Loss of such batteries to damage from over-charging could be a crucial loss to in some situations. Even more crucial is the possible injury to a user from an overcharging explosion. Such loss must be prevented.

As a result, numerous protective circuits have been developed, and sometimes designed into the parent devices, to protect these batteries from overcharging. Many of the protective circuits used in more critical applications have redundant circuitry included in order to provide as much security as possible. However, current redundant circuits are merely copies of the primary circuit and some types of failures can cause a failure of redundancy. Merely adding more iterations of identical circuitry, too, adds unnecessary weight and complexity to a device.

What is needed then, is a means of providing multiple safeguards in redundant protective circuits that minimize common failure modes. Furthermore, such a means of protection must minimize additional weight, complexity and cost.

SUMMARY OF THE INVENTION

Embodiments of the present invention disclose a method for providing improved reliability of redundant protective circuits. The method provides improved reliability at a minimum penalty in weight, complexity and cost.

The present invention relates to a method for providing improved reliability in a protective circuit. Specifically, embodiments of the present invention provide improved reliability by coupling the outputs of functional elements of redundant protective circuits through OR gates to the inputs of subsequent functional elements. By this cross-coupling of individual circuit output signals between redundant circuit blocks, a failure of any functional element can be bypassed, allowing any non-failed functional element to supply the signal missing from a failed functional element.

More specifically, embodiments of the present invention disclose an electronic circuit capable of preventing over-voltage conditions in an electronic device. The circuit includes a first section and a second section, each capable of simultaneously performing the functions of both sections. The first and second sections are comprised of equivalent functional elements coupled in a fashion that enables the circumvention of any failed functional element without degradation of the functionality of the overall electronic circuit.

BRIEF DESCRIPTION OF THE DRAWINGS

The operation of this invention can be best visualized by reference to the drawings.

Prior Art

Figure 1:
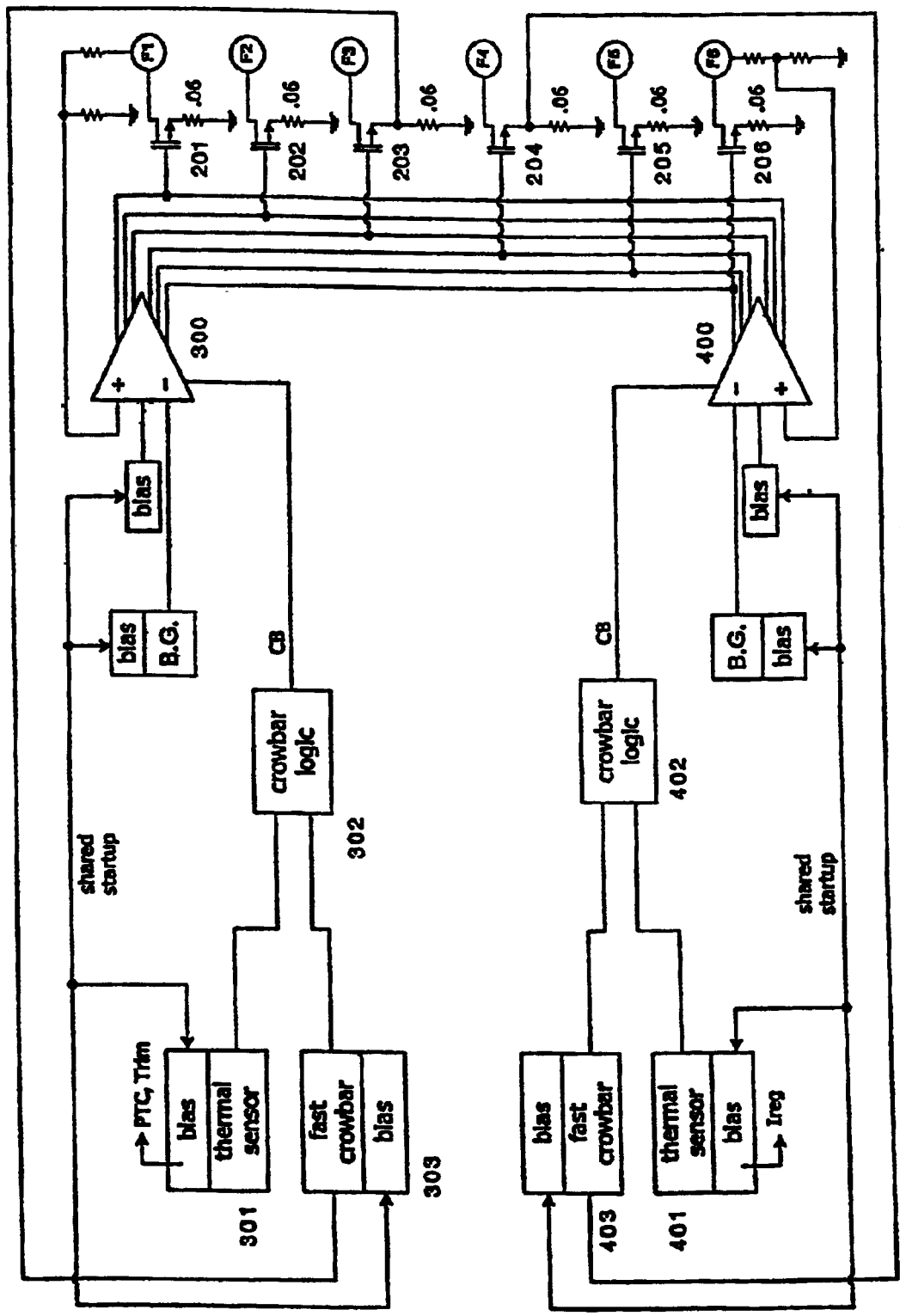
FIG. 1 illustrates an existing, exemplary, redundant protective circuit.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present Invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on signals within an electronic circuit. These descriptions and representations are the means used by those skilled in the electronic arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in an electronic system.

DETAILED DESCRIPTION

There many conceivable embodiments of the present invention. However, the concepts underlying the present invention may be best understood by the discussion of only a few embodiments. The discussion in no way limits the application of the concepts nor determines the limit to embodiments possible.

One envisioned embodiment of the present invention is in its application to a battery charging device. Modern rechargeable batteries, of the type used in modern electronic appliances, have reached very large energy densities, the amount of energy stored versus the size and weight of the battery. The convenience of the appliances has been greatly enhanced by the ability to recharge an on-board battery without removing it from the appliance and the ability to use the appliance for long periods without recharging. Modern, ultra-small, cellular telephones are a prime example of appliances using on-board charging systems.

In order to achieve high energy densities in rechargeable batteries, technologies have migrated to Nickel-Cadmium (NiCd), Nickel-Metal Hydride (NiMH) and Lithium Ion (Li-Ion). While each technology has its advantages, each suffers potentially catastrophic damage in the event of an overcharge, most particularly the expensive Li-Ion type. To prevent this costly damage, circuits have been developed to prevent overcharging, usually by limiting charging voltage when a battery's capacity is reached. However, the relative costs of modern batteries are so high that the rare failure of a protective circuit can be extremely costly, most particularly in a critical appliance.

To increase the reliability of protective circuits, they have been made redundant; i.e. they have begun to be made with multiple circuit sections performing the same function in the same integrated circuit. This approach, though, is limited by size constraints. The reliability of redundancy, too, may not be increased merely by the addition of another, identical, circuit section to a protective circuit if failures happen in multiple circuit sections.

One embodiment of the present invention provides a means of increasing the reliability of redundant circuits without incurring the entailed penalties of adding more redundant circuits. This embodiment envisions a set of cross-coupled connections that tie individual signals present in parts of one logical section to the same points in redundant sections, and vice-versa. These cross-coupled connections are tied to logical OR gates in each circuit section in order to allow a functioning signal in either circuit to provide the necessary input to a subsequent functional element in another circuit without interference with the function of the signal's source.

The detailed operation of this embodiment of the present invention may be best understood by reference to the drawings. Prior art FIG. 1 illustrates a redundant "safety circuit" as implemented in part of an existing battery charging control device. Battery charging voltage is present at nodes F1 through F6. The voltage is shunted to ground, when required, by the action of shunt transistors 201 through 206, which are controlled by the outputs of shunt amplifiers 300 and 300. Note that either shunt amplifier can drive all shunt transistors. In this implementation, the shunt amplifiers drive the shunt transistors to shunt charging current to ground when a high voltage or a high temperature is sensed by the controlling circuitry. Also in this implementation, the shunt transistors are implemented as metal-oxide/silicon field-effect transistors (MOSFET).

The circuitry controlling each shunt amplifier is separate but identical, resulting in completely redundant safety circuitry. The redundancy is reflected in an increased margin of safety, allowing the shunt transistors to continue working in the event of a failure in either of the two redundant circuit sections. However, two failures, one in each safety circuit, could result in total device failure with the attendant damage that could arise.

Figure 2:
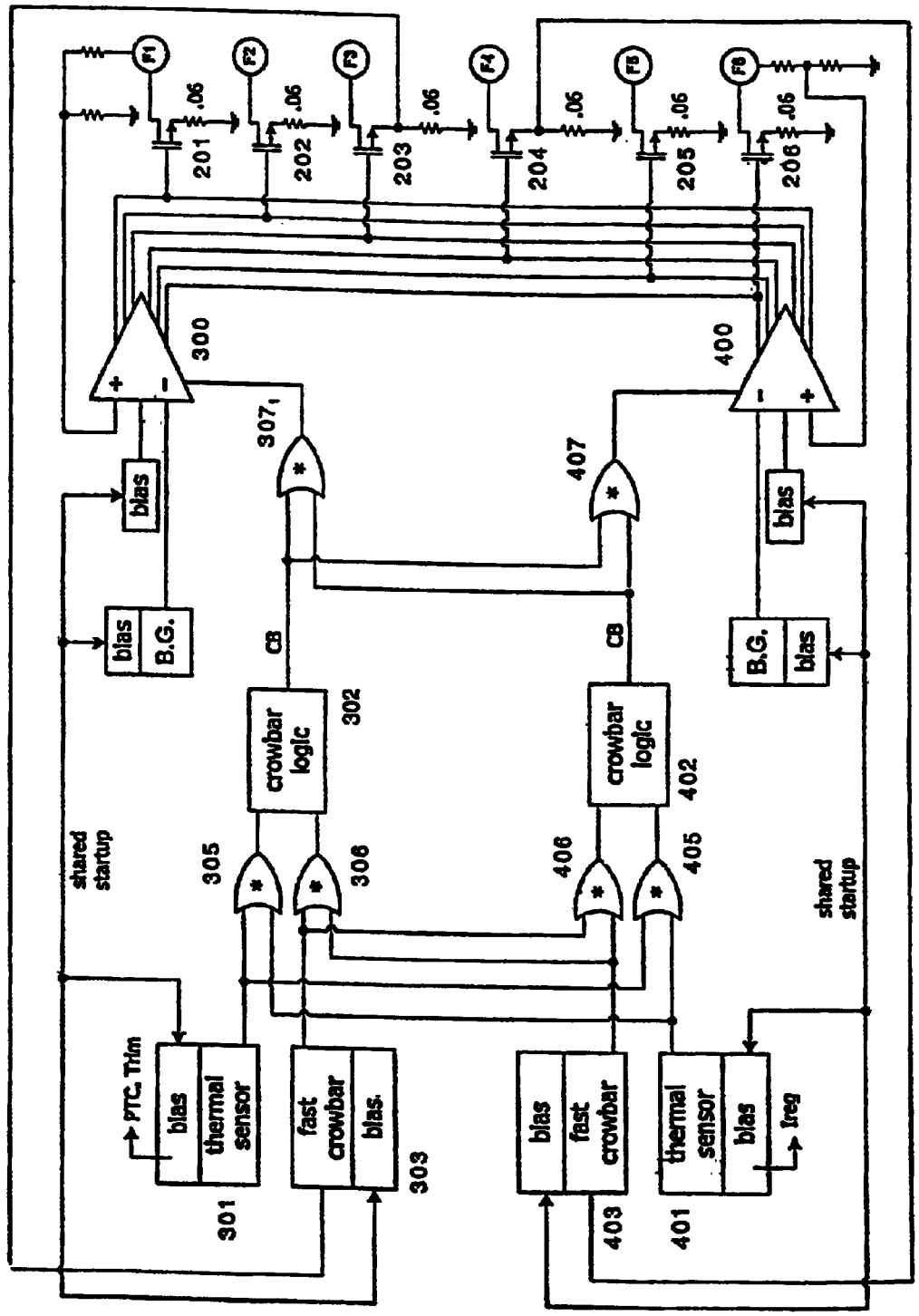
FIG. 2 Illustrates a redundant protective circuit in accordance with the present invention.

The embodiment of the present invention discussed here, and illustrated in FIG. 2, reduces the susceptibility to a failure in each circuit. In this embodiment, particular points in each redundant logical circuit section are cross-coupled to the same points in the counterpart logical circuit section. The connections, as shown in FIG. 2, are made to OR gate inputs so that the logical signal is present at the OR gate output in a logical circuit section but supplying the signal to the other logical circuit section has no effect on the operation of the originating logical circuit section.

For example, the output signals from thermal sensor functional element 301 and thermal sensor 401, located in and part of separate logical circuit sections, are both present at the inputs to OR gate connection 305 whose output is the input to "crowbar logic" functional element 302. If all functional elements are in full operation, the input to functional element 302 is the same as if it were only driven by the signal output from thermal sensor 301. However, if thermal sensor 301 fails to output a signal, the existence of the output signal from thermal sensor 401 insures proper operation of crowbar logic functional element 302. Note that, whether the equivalent element is properly outputting a signal or not, the non-failed functional elements remain unaffected by the combination of input signals.

In this embodiment, the two thermal sensor functional elements' output signals are combined at OR gates 305 and 405. So, too, are the "fast crowbar" biasing elements 303 and 403 combined at OR gates 306 and 406 and the outputs of crowbar logic functional elements 302 and 402 are combined at OR gates 307 and 407. The outputs of OR gates 305 and 306 then become the inputs to crowbar logic functional element 302. Similarly, the outputs of OR gates 405 and 406 are the inputs to functional element 402 in the counterpart logical circuit section. So, too, do the outputs of OR gates 307 and 407 become the inputs to shunt amplifiers 300 and 400, respectively.

It is appreciated that the logical OR gates illustrated in the drawings and referred to in this description may be implemented in any number of ways. Not only could they be binary state OR gates but they could also be signal emulators, amplifiers, or any other means by which a signal could be detected at either or both inputs and repeated at the output. The term "OR gate" refers only to the logical function and not the physical implementation.

The purpose of illustrating this embodiment of the present invention with OR gates is to illuminate the concept presented. Signals are provided at the inputs to a functional element even though the preceding functional element which normally supplies the signal, may be malfunctioning. The source of the signal is the properly functioning, equivalent, functional element found in the redundant logical circuit section. Furthermore, a functional element's providing those signals to both a subsequent functional element and the equivalent subsequent functional element in the counterpart logical circuit section does not affect the originating functional element in any way.

Thus, in this embodiment of the present invention, not only is an entire logical circuit section backed up by a redundant logical circuit section but each functional element of a logical circuit section is backed up individually by a redundant, equivalent functional element within the redundant section. In this manner, a maximum of redundancy reliability is achieved with a minimum of additional circuitry.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An electronic circuit, comprising:
   a first logical section, comprising functional elements, wherein said first logical section is capable of independently providing over-voltage protection to an electronic device; and,
   a second logical section comprising functional elements, wherein said second logical section is capable of independently providing over-voltage protection to an electronic device;
   wherein said functional elements are coupled between logical sections so as to accommodate the circumvention of failed functional elements residing in both said first and said second logical sections to maintain the operation of both said first and said second logical sections.

2. The electronic circuit described in claim 1, wherein said first section and said second section comprise the functional elements of:
   a shunt transistor adapted to shunt current away from said electronic device;
   a controlling amplifier electronically coupled to said shunt transistor and adapted to drive said shunt transistor; and,
   a biasing element electronically coupled to said controlling amplifier and adapted to bias said controlling amplifier by reference to the outputs of a voltage sensing element.

3. The electronic circuit described in claim 1, wherein a biasing element is further adapted to bias a controlling amplifier by reference to the outputs of a temperature sensing element.

4. The electronic circuit described in claim 1, wherein the output of a voltage sensing element in said first section is coupled by a logical OR gate to the output of a biasing element of said second section.

5. The electronic circuit described in claim 1, wherein the output of a temperature sensing element in said first section is coupled by a logical OR gate to the output of a biasing element of said second section.

6. The electronic circuit described in claim 1, wherein the output of a temperature sensing element in said second section is coupled by a logical OR gate to the output of a biasing element of said first section.

7. The electronic circuit described in claim 1, wherein the output of a voltage sensing element in said second section is coupled by a logical OR gate to the input of a controlling element of said first section.

8. The electronic circuit described in claim 1, wherein the output of a crowbar logic functional element in said first section is coupled by a logical OR gate to the input of a controlling amplifier of said second section.

9. The electronic circuit described in claim 1, wherein the output of a crowbar logic functional element in said second section is coupled by a logical OR gate to the input of a controlling amplifier of said first section.

10. The electronic circuit described in claim 1, wherein the outputs of functional elements of said first section are coupled by a logical OR gate with the outputs of equivalent functional elements of said second section, so that said outputs of said functional elements in said first section are capable of providing input to the appropriate functional element in said second section of said circuit.

11. The electronic circuit described in claim 1 wherein the outputs of functional elements of said second section are coupled by a logical OR gate with the outputs of equivalent functional elements of said first section, so that said outputs of said functional elements in said second section are capable of providing input to the appropriate functional element in said first section of said circuit.

12. The electronic circuit described in claim 1 wherein said electronic circuit is integrally coupled to a battery charging device wherein said battery charging device is integrally coupled to another device.

13. A method for improving the reliability of a redundantly configured electronic protective circuit, comprising the steps of:
   a) sensing a device state in a first logical section of said electronic protective circuit;
   b) sensing a device state in a second logical section of said electronic protective circuit;
   c) providing said device state on two or more redundant outputs;
   d) driving two or more redundant functional elements by reference to said device state; and,
   e) controlling two or more subsequent redundant functional elements adapted to divert current away from said electronic protective circuit, by reference to the output of anyone of said redundant functional elements,
   wherein said functional elements are coupled between logical sections so as to accommodate the circumvention of failed functional elements residing in both said first and said second logical sections to maintain the operation of both said first and said second logical sections.

14. The method described in claim 13, wherein said device state is a voltage.

15. The method described in claim 13, wherein said device state is a temperature.

16. The method described in claim 13, wherein said device state is a battery over-charge condition.

17. An apparatus for preventing overcharging of a battery, comprising:
   a charge state sensing device; and,
   a charging voltage reducing device;
   wherein each device comprises at least two logical sections,
   wherein functional elements are coupled between logical sections so as to accommodate the circumvention of failed functional elements residing in both a first and a second logical section to maintain the operation of both said first and said second logical sections.

18. The apparatus described in claim 17, wherein said sections of said charge state sensing device each comprise:
   a voltage sensing device; and,
   a temperature sensing device;
   wherein each of said sections enables the output of a sensing device to be redundantly combined with the output of an equivalent sensing device in said other section.

19. The apparatus described in claim 17, wherein the output of functional elements in said first logical section is coupled by a logical OR gate to the output of the equivalent functional elements of said second logical section.

20. The apparatus described in claim 17, wherein the input of a functional element in any section of a functional device is capable of being provided by an output from another section.

* * * * *